US012726713B2

(12) United States Patent
Kogure et al.

(10) Patent No.: US 12,726,713 B2
(45) Date of Patent: Sep. 1, 2026

(54) CAMERA CONTROL DEVICE, STORAGE MEDIUM, AND CAMERA CONTROL METHOD

(71) Applicant: CANON KABUSHIKI KAISHA, Tokyo (JP)

(72) Inventors: Kentaro Kogure, Tokyo (JP); Jun Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 289 days.

(21) Appl. No.: 18/442,237

(22) Filed: Feb. 15, 2024

(65) Prior Publication Data

US 2024/0292107 A1 Aug. 29, 2024

(30) Foreign Application Priority Data

Feb. 28, 2023 (JP) ................................ 2023-029106

(51) Int. Cl.
*H04N 23/73* (2023.01)
*G03B 17/18* (2021.01)
*H04N 23/71* (2023.01)

(52) U.S. Cl.
CPC ............. *H04N 23/73* (2023.01); *G03B 17/18* (2013.01); *H04N 23/71* (2023.01)

(58) Field of Classification Search
CPC ......... H04N 23/73; H04N 23/71; G03B 17/18
See application file for complete search history.

(56) References Cited

U.S. PATENT DOCUMENTS

2014/0267828 A1* 9/2014 Kasai .................... H10F 39/803 348/229.1
2014/0340528 A1 11/2014 Park et al.
2020/0068112 A1* 2/2020 Zhang ................. H04N 23/681

FOREIGN PATENT DOCUMENTS

JP 2001-024951 A 1/2001
JP 2006-178075 A 7/2006
JP 2014-096714 A 5/2014

OTHER PUBLICATIONS

Mar. 6, 2025 Japanese Official Action in Japanese Patent Appln. No. 2023-029106.

* cited by examiner

*Primary Examiner* — Sinh Tran
*Assistant Examiner* — Angel L Garces-Rivera
(74) *Attorney, Agent, or Firm* — Venable LLP

(57) ABSTRACT

A camera control device estimates a deterioration degree indicating a degree of deterioration in an image capturing element converting an image of a subject into an electrical signal, and controls parameters related to an amount of exposure to the image capturing element such that the amount of exposure to the image capturing element becomes equal to or smaller than a predetermined amount of exposure when the deterioration degree satisfies a predetermined condition.

20 Claims, 19 Drawing Sheets

| | | | | |
|---|---|---|---|---|
| 30 | 50 | 50 | 80 | 120 |
| 100 | 140 | 160 | 180 | 180 |
| 80 | 100 | 120 | 160 | 100 |
| 50 | 50 | 80 | 80 | 50 |

FIG. 6

| Deterioration degree | Low | Moderate | High |
|---|---|---|---|
| Largest value of average luminance | 150 or smaller | 151-199 | 200 or larger |
| Amount of correction | 0.0EV (No correction) | −0.5EV | −1.0EV |

FIG. 11

| | | Short-period deterioration degree | | |
|---|---|---|---|---|
| | | Low | Moderate | High |
| Long-period deterioration degree | Low | Normal program diagram | Deterioration curbing program diagram (Low level) | Deterioration curbing program diagram (Low level) |
| | Moderate | Deterioration curbing program diagram (Low level) | Deterioration curbing program diagram (Low level) | Deterioration curbing program diagram (High level) |
| | High | Deterioration curbing program diagram (Low level) | Deterioration curbing program diagram (High level) | Deterioration curbing program diagram (High level) |

| | | | | |
|---|---|---|---|---|
| 30 | 50 | 50 | 80 | 120 |
| 100 | 140 | 180 | 220 | 220 |
| 80 | 100 | 120 | 180 | 180 |
| 50 | 50 | 80 | 80 | 50 |

FIG. 15

| | | Short-period deterioration degree | | |
|---|---|---|---|---|
| | | Low | Moderate | High |
| Long-period deterioration degree | Low | 0.0EV (No correction) | −0.5EV | −1.0EV |
| | Moderate | −0.5EV | −1.0EV | −1.5EV |
| | High | −1.0EV | −1.5EV | −2.0EV |

Figure 19:
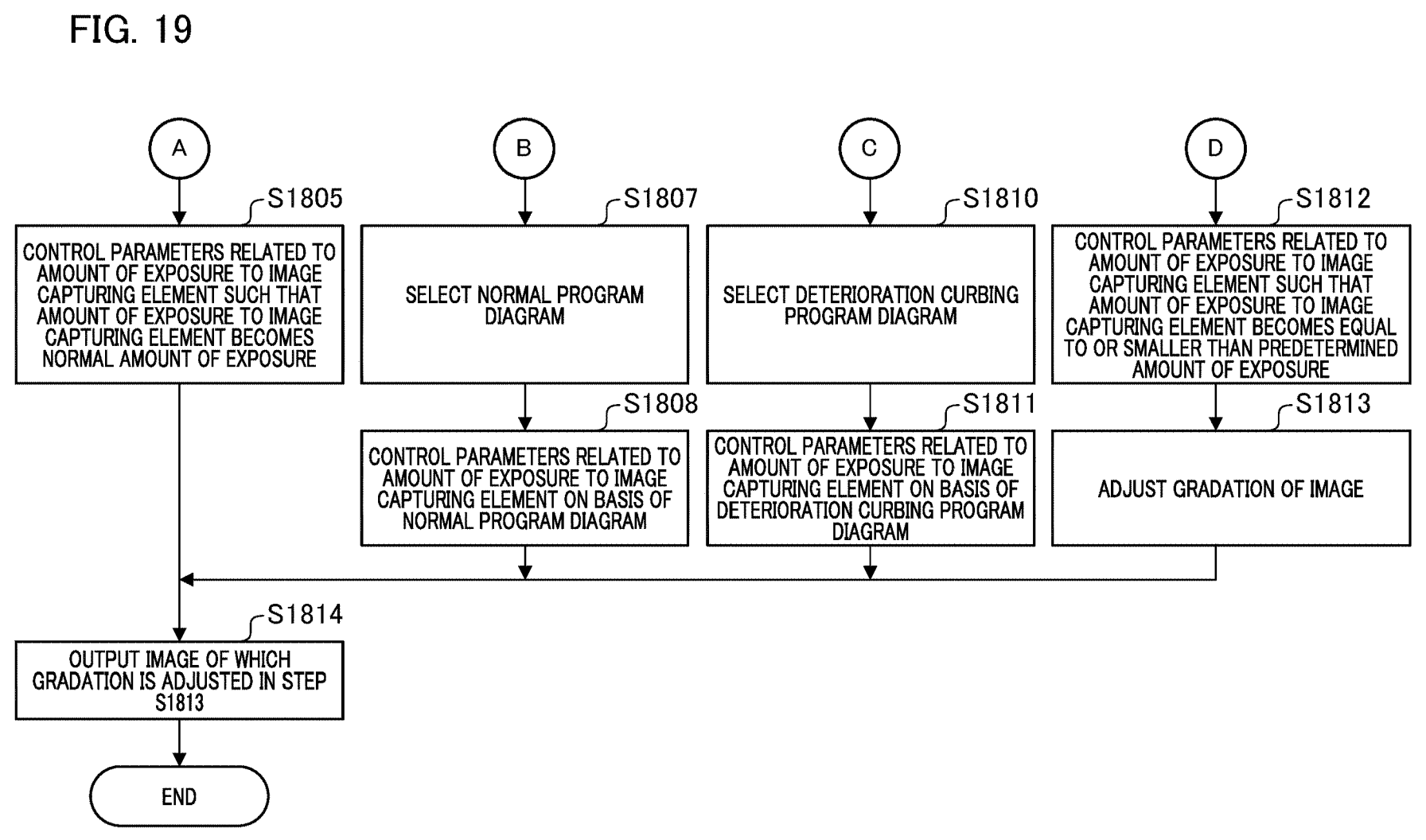

S1805 CONTROL PARAMETERS RELATED TO AMOUNT OF EXPOSURE TO IMAGE CAPTURING ELEMENT SUCH THAT AMOUNT OF EXPOSURE TO IMAGE CAPTURING ELEMENT BECOMES NORMAL AMOUNT OF EXPOSURE

B

S1807 SELECT NORMAL PROGRAM DIAGRAM

S1808 CONTROL PARAMETERS RELATED TO AMOUNT OF EXPOSURE TO IMAGE CAPTURING ELEMENT ON BASIS OF NORMAL PROGRAM DIAGRAM

C

S1810 SELECT DETERIORATION CURBING PROGRAM DIAGRAM

S1811 CONTROL PARAMETERS RELATED TO AMOUNT OF EXPOSURE TO IMAGE CAPTURING ELEMENT ON BASIS OF DETERIORATION CURBING PROGRAM DIAGRAM

D

S1812 CONTROL PARAMETERS RELATED TO AMOUNT OF EXPOSURE TO IMAGE CAPTURING ELEMENT SUCH THAT AMOUNT OF EXPOSURE TO IMAGE CAPTURING ELEMENT BECOMES EQUAL TO OR SMALLER THAN PREDETERMINED AMOUNT OF EXPOSURE

S1813 ADJUST GRADATION OF IMAGE

S1814 OUTPUT IMAGE OF WHICH GRADATION IS ADJUSTED IN STEP S1813

END

CAMERA CONTROL DEVICE, STORAGE MEDIUM, AND CAMERA CONTROL METHOD

BACKGROUND OF THE INVENTION

Field of the Invention

The present invention relates to a camera control device, a storage medium, and a camera control method.

Description of the Related Art

Generally, cameras are equipped with auto exposure (AE) control. Auto exposure control is a function of mainly controlling elements related to exposure, such as a shutter speed, an aperture, and a gain, in accordance with a brightness of a subject.

In addition, in recent years, photon counting-type single photon avalanche diode (SPAD) sensors, which are one of image capturing elements mounted in cameras, have been increasing in number of pixels and are expected to be applied to monitoring cameras focused on low-illumination performance.

Cameras in which a SPAD sensor is employed as an image capturing element also have a concept of exposure, and it is preferable to execute appropriate control for exposure.

Regarding a document disclosing a technology of controlling elements related to exposure, for example, in the camera disclosed in Japanese Patent Laid-Open No. 2006-178075, a program diagram is changed on the basis of characteristics of an image capturing means and characteristics of an image capturing optical system, and a combination of an aperture value and a shutter speed is determined based on the changed program diagram.

In the image capturing device disclosed in Japanese Patent Laid-Open No. 2014-96714, power consumption of a complementary metal-oxide-semiconductor (CMOS) is decremented by decrementing the amount of light incident on the CMOS. This image capturing device decrements the amount of light incident on a photodiode by reducing the opening area of an aperture blade or by shortening the exposure time of a shutter curtain.

However, in the camera according to Japanese Patent Laid-Open No. 2006-178075, deterioration in the image capturing means is not taken into consideration. Similarly, in the image capturing device according to Japanese Patent Laid-Open No. 2014-96714, deterioration in the CMOS is not taken into consideration. Meanwhile, in SPAD sensors, dark currents and direct current resistances (DCR) may increase as the period of use of a camera increases.

SUMMARY OF THE INVENTION

A camera control device according to an aspect of the present invention includes at least one processor; and a memory coupled to the at least one processor, the memory storing instructions that, when executed by the at least one processor, cause the at least one processor to: estimate a deterioration degree indicating a degree of deterioration in an image capturing element converting an image of a subject into an electrical signal, and control parameters related to an amount of exposure to the image capturing element such that the amount of exposure to the image capturing element becomes equal to or smaller than a predetermined amount of exposure when the deterioration degree satisfies a predetermined condition.

Further features of the present invention will become apparent from the following description of embodiments with reference to the attached drawings.

BRIEF DESCRIPTION OF THE DRAWINGS

FIG. 5 is a view showing an example of regions corresponding to respective regions set by the camera control device in the image shown in FIG. 4 and an example of the average luminance measured for each of the regions.

FIG. 6 is a view showing an example of a relationship between a deterioration degree of an image capturing element estimated by the camera control device according to the First Embodiment, the average luminance measured for each of the regions shown in FIG. 4, and an amount of correction for an amount of exposure.

FIG. 11 is a view showing an example of a relationship between a short-period deterioration degree and a long-period deterioration degree estimated by the camera control device according to the Second Embodiment and a program diagram selected by the camera control device.

FIG. 14 is a view showing an example of a plurality of regions set in an image according to the Second Embodiment and an example of the average luminance measured for each of the regions.

FIG. 15 is a view showing an example of a relationship between the short-period deterioration degree and the long-period deterioration degree estimated by the camera control device according to the Second Embodiment and the amount of correction for the amount of exposure.

FIG. 19 is a flowchart showing another example of processing executed by the camera control device according to the Second Embodiment.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment

Figure 1:
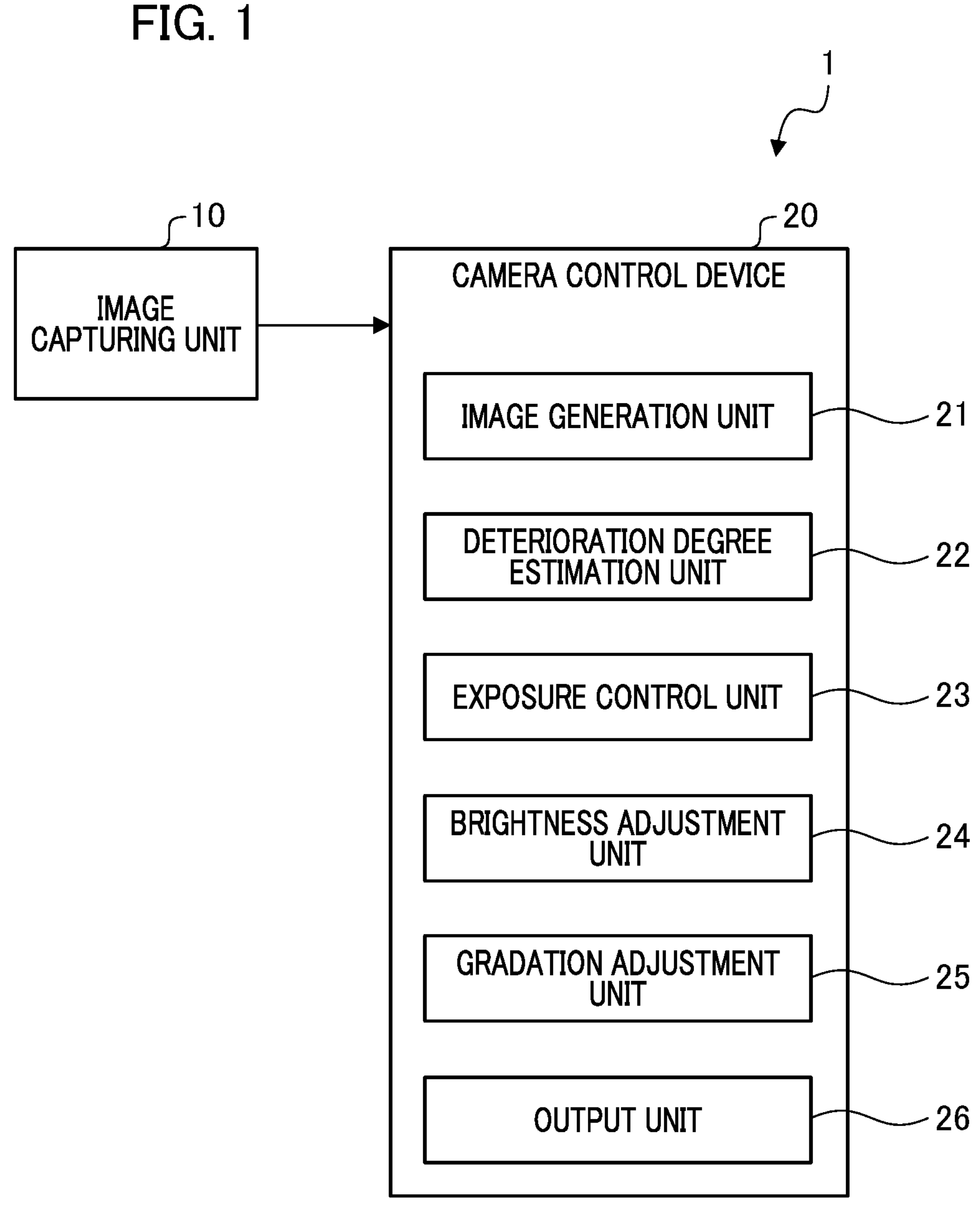
FIG. 1 is a view showing an example of a constitution of a camera according to a First Embodiment.

A camera control device according to a First Embodiment will be described with reference to FIGS. 1 to 7. FIG. 1 is a view showing an example of a constitution of a camera according to the First Embodiment. For example, a camera 1 is a digital still camera or a digital video camera. As shown in FIG. 1, the camera 1 includes an image capturing unit 10 and a camera control device 20.

Figure 2:
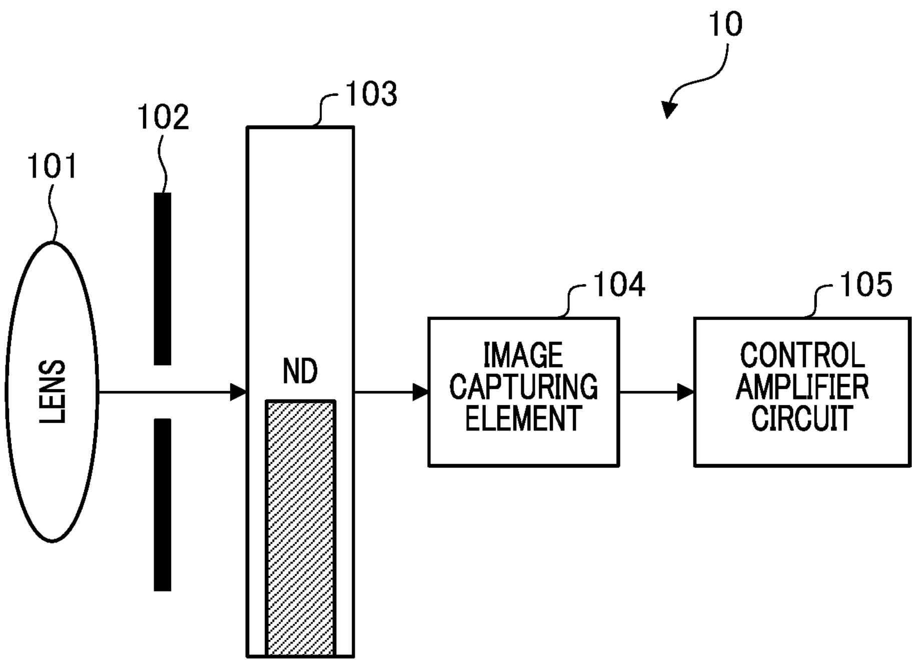
FIG. 2 is a view showing an example of a detailed constitution of an image capturing unit shown in FIG. 1.

The image capturing unit 10 generates images by taking in light from outside the camera 1. FIG. 2 is a view showing an example of a detailed constitution of an image capturing unit shown in FIG. 1. As shown in FIG. 2, the image capturing unit 10 includes a lens 101, an aperture 102, a filter 103, an image capturing element 104, and a control amplifier circuit (AGC: automatic gain control) 105.

The lens 101 is included in an optical system in which light from the outside of the camera 1 is taken in and an image of a subject is formed on a light reception surface of the image capturing element 104. The aperture 102 adjusts the amount of light taken into the optical system by adjusting the area of an opening and adjusts the amount of exposure to the image capturing element 104.

For example, the filter 103 is a neutral density (ND) filter, which decrements the amount of exposure to the image capturing element 104. The filter 103 may have unique transmittance characteristics and may decrement the amount of exposure to the image capturing element 104 by being inserted and pulled on an optical path to the light reception surface of the image capturing element 104. Alternatively, the filter 103 may decrement the amount of exposure to the image capturing element 104 by electrically controlling the transmittance characteristics.

For example, the image capturing element 104 is a SPAD sensor, which converts an image of a subject into an electrical signal. The image capturing element 104 has a light reception surface on which photons that have passed through the lens 101, the aperture 102, and the filter 103 are incident.

The image capturing element 104 includes a photon counting unit executing photon number counting processing of counting the number of incident photons or photon number integrating processing of integrating incident photons over a predetermined period of time. In addition, the photon counting unit may execute the photon number counting processing or the photon number integrating processing for each of regions set on the light reception surface of the image capturing element 104.

These regions may be regions each corresponding to one pixel of an image converted into an electrical signal by the image capturing element 104 or may be regions each corresponding to a region including a plurality of such pixels. For example, in the case of a SPAD sensor, the image capturing element 104 counts the number of photons incident on an avalanche photodiode (APD) and outputs the counted number of photons as a digital signal.

The control amplifier circuit 105 executes automatic gain control of the camera 1. Specifically, the control amplifier circuit 105 adjusts a gain for amplifying a digital signal output by the image capturing element 104.

In addition, the camera 1 may convert a digital signal output by the image capturing element 104 into an analog signal using an analog-to-digital converter. In this case, the control amplifier circuit 105 adjusts a gain for amplifying an analog signal output by the analog-to-digital converter.

Figure 3:
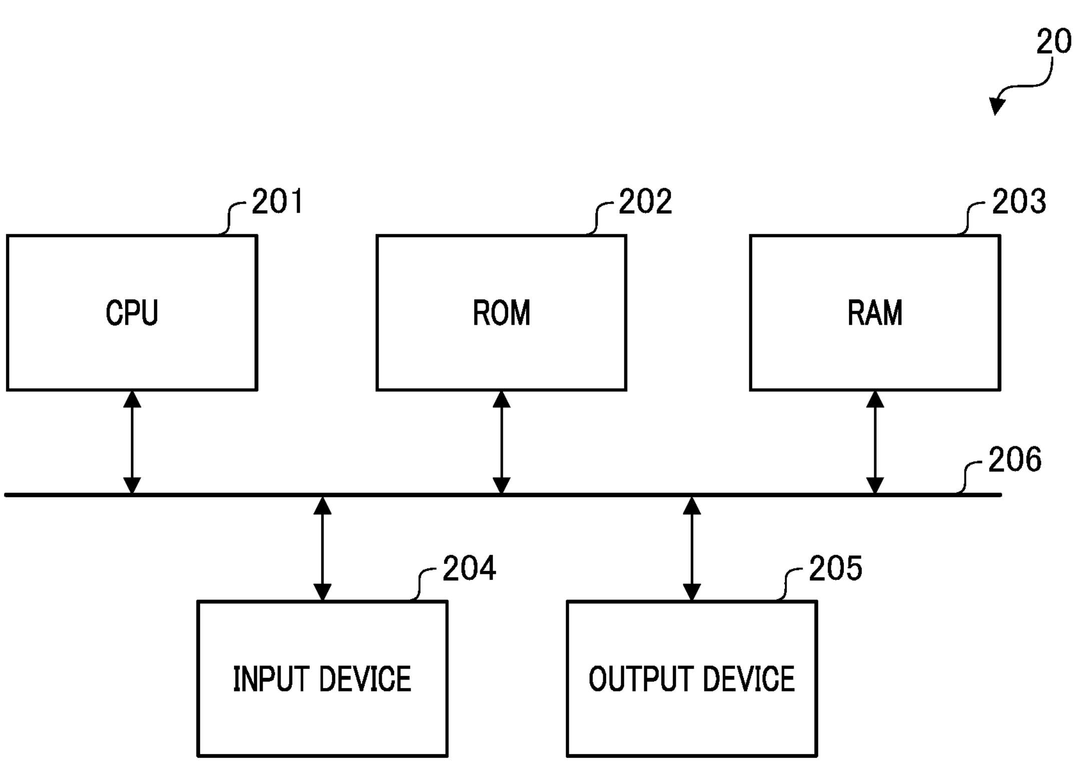
FIG. 3 is a view showing an example of a hardware constitution of a camera control device shown in FIG. 1.

FIG. 3 is a view showing an example of a hardware constitution of the camera control device shown in FIG. 1. As shown in FIG. 3, the camera control device 20 includes a central processing unit (CPU) 201, a read only memory (ROM) 202, a random access memory (RAM) 203, an input device 204, and an output device 205.

The CPU 201 realizes a function of the camera control device 20 by reading and executing a program. The ROM 202 stores a program and the like which are read and executed by the CPU 201.

In the RAM 203, when a program is executed by the CPU 201, the program and data related thereto are developed. For example, the input device 204 is a touch panel, a button, or the like and is used for an input of an instruction required for operating the camera control device 20. For example, the output device 205 is a display, a speaker, or the like and outputs information to be presented to a user of the camera 1.

As shown in FIG. 1, the camera control device 20 includes an image generation unit 21, a deterioration degree estimation unit 22, an exposure control unit 23, a brightness adjustment unit 24, a gradation adjustment unit 25, and an output unit 26. The image generation unit 21, the deterioration degree estimation unit 22, the exposure control unit 23, the brightness adjustment unit 24, the gradation adjustment unit 25, and the output unit 26 are realized by the CPU 201 shown in FIG. 3 developing and executing the program stored in the ROM 202 in the RAM 203.

The image generation unit 21 generates an image of a subject from an electrical signal output by the control amplifier circuit 105.

The deterioration degree estimation unit 22 executes luminance measuring processing of measuring luminance of an image converted into an electrical signal by the image capturing element 104 and estimates a deterioration degree on the basis of the luminance measured through the luminance measuring processing. In this case, the deterioration degree estimation unit 22 may execute the luminance measuring processing for each of the regions set on the light reception surface of the image capturing element 104 and may estimate the deterioration degree For each of the regions.

Figure 4:
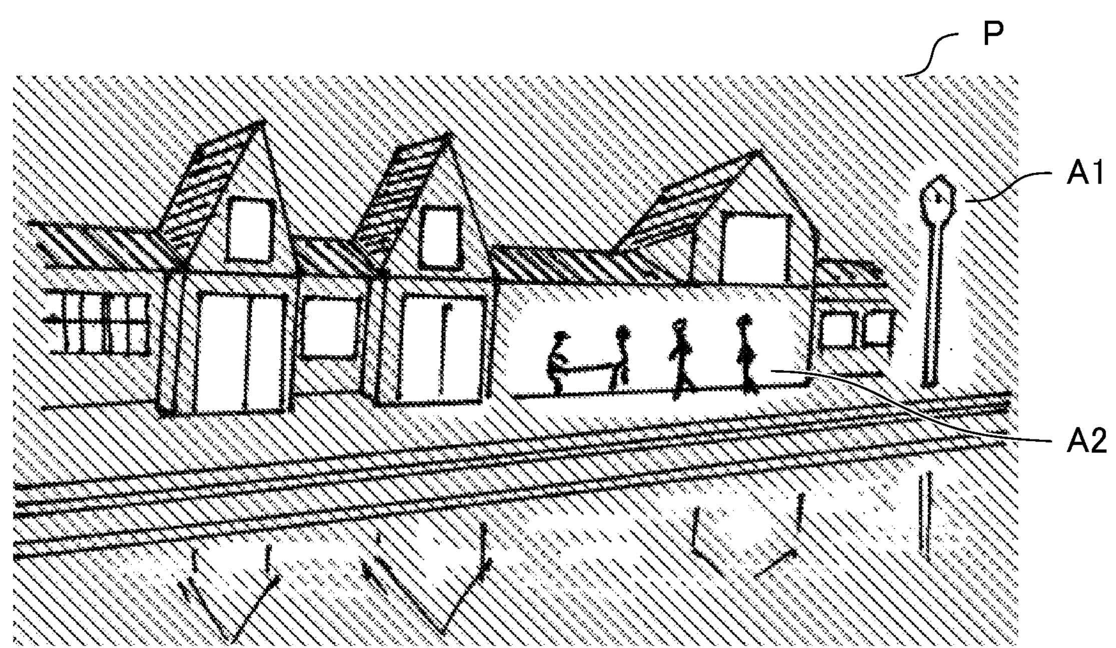
FIG. 4 is a view showing an example of an image generated by the camera according to the First Embodiment.

FIG. 4 is a view showing an example of an image generated by the camera according to the First Embodiment. An image P shown in FIG. 4 projects a nighttime scene generated by the camera 1. Since a region A1 shown in FIG. 4 is a region in which a streetlight is projected, it is brighter than other regions in the image P. Similarly, in a region A2 shown in FIG. 4, a plurality of persons at a bright place are projected.

FIG. 5 is a view showing an example of regions corresponding to respective regions set by the camera control device in the image shown in FIG. 4 and an example of the average luminance measured for each of the regions. For example, the deterioration degree estimation unit 22 sets a rectangular region disposed in four rows and five columns on the rectangular light reception surface of the image capturing element 104 and executes the luminance measuring processing for each of the regions.

As shown in FIG. 5, these regions respectively correspond to the twenty regions on the image P. In addition, for example, the luminance in each of these regions has one of the numerical values shown in FIG. 5. Each of the numerical values shown in FIG. 5 indicates the average luminance for each of the regions when the luminance of the image P is normalized in 256 levels (0 to 255) in total.

For example, since the number of photons incident on the light reception surface of the image capturing element 104 is larger in a region having a numerical value exceeding 200 than in other regions, it can be said that the deterioration degree of the image capturing element 104 therein is higher than in other regions.

The deterioration degree estimation unit 22 estimates the deterioration degree on the basis of the largest value of the twenty values of the average luminance in total shown in FIG. 5. The deterioration degree estimation unit 22 may estimate the deterioration degree on the basis of an arithmetic average or a weighted average of the twenty values of the average luminance in total shown in FIG. 5.

FIG. 6 is a view showing an example of a relationship between a deterioration degree of an image capturing element estimated by the camera control device according to the First Embodiment, the average luminance measured for each of the regions shown in FIG. 4, and an amount of correction for an amount of exposure.

The first row from the top of the table shown in FIG. 6 shows an example of a division of the deterioration degrees estimated by the deterioration degree estimation unit 22. The second row from the top of the table shown in FIG. 6 shows an example of a division of the largest values of the twenty values of the average luminance in total shown in FIG. 5. The third row from the top of the table shown in FIG. 6 shows an example of the amounts of correction for the amount of exposure executed by the exposure control unit 23.

As shown in FIG. 6, when it is estimated that the largest value of the average luminance is 150 or smaller, the deterioration degree estimation unit 22 estimates that the deterioration degree corresponds to “low”. In addition, as shown in FIG. 6, when it is estimated that the largest value of the average luminance is 151 or larger and is smaller than 200, the deterioration degree estimation unit 22 estimates that the deterioration degree corresponds to “moderate”.

In addition, as shown in FIG. 6, when it is estimated that the largest value of the average luminance is 200 or larger, the deterioration degree estimation unit 22 estimates that the deterioration degree corresponds to “high”. In the case shown in FIG. 5, since the largest value of the average luminance is “180”, the deterioration degree estimation unit 22 estimates that the deterioration degree of the image capturing element 104 corresponds to “low”.

The deterioration degree estimation unit 22 may estimate the deterioration degree with a scale other than three levels of “low”, “moderate”, and “high” shown in FIG. 6, for example, four or more levels or two levels.

In addition, the deterioration degree estimation unit 22 executes luminance integrating processing of integrating the luminance of an image converted into an electrical signal by the image capturing element 104 over a predetermined period of time and estimates the deterioration degree on the basis of the luminance integrated through the luminance integrating processing. In this case, the deterioration degree estimation unit 22 may execute the luminance integrating processing for each of the regions set on the light reception surface of the image capturing element 104 and may estimate the deterioration degree For each of the regions.

The deterioration degree estimation unit 22 may estimate a deterioration degree indicating a degree of deterioration in the image capturing element 104. For example, the deterioration degree estimation unit 22 may estimate the deterioration degree on the basis of the number of photons counted through the photon number counting processing described above.

In addition, when the photon number counting processing is executed for each of the regions set on the light reception surface of the image capturing element 104, the deterioration degree estimation unit 22 may estimate the deterioration degree For each of the regions. In addition, for example, the deterioration degree estimation unit 22 may estimate the deterioration degree on the basis of the number of photons integrated through the photon number integrating processing described above.

In addition, when the photon number integrating processing is executed for each of the regions set on the light reception surface of the image capturing element 104, the deterioration degree estimation unit 22 may estimate the deterioration degree for each of the regions.

Alternatively, the deterioration degree estimation unit 22 may execute evaluation value calculating processing of calculating an evaluation value related to a brightness of an image converted into an electrical signal by the image capturing element 104 and may estimate the deterioration degree on the basis of the evaluation value calculated through the evaluation value calculating processing. In this case, the deterioration degree estimation unit 22 may execute the evaluation value calculating processing for each of the regions set on the light reception surface of the image capturing element 104 and may estimate the deterioration degree For each of the regions.

In addition, the deterioration degree estimation unit 22 may execute evaluation value integrating processing of integrating an evaluation value related to a brightness of an image converted into an electrical signal by the image capturing element 104 over a predetermined period of time and may estimate the deterioration degree on the basis of the evaluation value integrated through the evaluation value integrating processing. In this case, the deterioration degree estimation unit 22 may execute the evaluation value integrating processing for each of the regions set on the light reception surface of the image capturing element 104 and may estimate the deterioration degree For each of the regions.

When the deterioration degree satisfies a predetermined condition, the exposure control unit 23 controls parameters related to the amount of exposure to the image capturing element 104 such that the amount of exposure to the image capturing element 104 becomes equal to or smaller than a predetermined amount of exposure. The said predetermined condition is that the deterioration degree is equal to or higher than a predetermined threshold, for example. In addition, the parameters related to the amount of exposure to the image capturing element 104 are at least one of a shutter speed, an aperture value, a transmittance of a filter, and a gain, for example.

For example, as shown in the third row from the top of FIG. 6, when the deterioration degree of the image capturing element 104 is estimated to be "low", the exposure control unit 23 controls the parameters related to the amount of exposure to the image capturing element 104 such that the amount of correction for the amount of exposure to the image capturing element 104 becomes 0.0 EV (exposure value). Regarding this amount of correction, in the case of a negative value, it expresses decrement of the brightness of an image, and in the case of a positive value, it expresses increment of the brightness of an image.

Similarly, as shown in the third row from the top of FIG. 6, when the deterioration degree of the image capturing element 104 is estimated to be "moderate", the exposure control unit 23 controls the parameters related to the amount of exposure to the image capturing element 104 such that the amount of correction for the amount of exposure to the image capturing element 104 becomes −0.5 EV.

In addition, as shown in the third row from the top of FIG. 6, when the deterioration degree of the image capturing element 104 is estimated to be "high", the exposure control unit 23 controls the parameters related to the amount of exposure to the image capturing element 104 such that the amount of correction for the amount of exposure to the image capturing element 104 becomes −1.0 EV.

In the case shown in FIG. 5, since the largest value of the average luminance is estimated to be "180", the exposure control unit 23 controls the parameters related to the amount of exposure to the image capturing element 104 such that the amount of correction for the amount of exposure to the image capturing element 104 becomes −0.5 EV.

In addition, the exposure control unit 23 may control the parameters related to the amount of exposure to the image capturing element 104 on the basis of the brightness of the region in which the deterioration degree is equal to or higher than a predetermined deterioration degree.

The brightness adjustment unit 24 increments the brightness of an image generated after the parameters related to the amount of exposure to the image capturing element 104 are controlled by the exposure control unit 23.

For example, the brightness adjustment unit 24 amplifies a signal by adjusting the gain such that the image becomes brighter by the amount corresponding to the amount of exposure decremented by the exposure control unit 23. Although it is preferable to execute the processing by the brightness adjustment unit 24, it may not be executed.

The gradation adjustment unit 25 adjusts the gradation of an image generated after the parameters related to the amount of exposure to the image capturing element 104 are controlled by the exposure control unit 23. For example, the gradation adjustment unit 25 adjusts a gamma value such that the image becomes brighter by the amount corresponding to the amount of exposure decremented by the exposure control unit 23. Although it is preferable to execute the processing by the gradation adjustment unit 25, it may not be executed.

The output unit 26 outputs an image generated after the parameters related to the amount of exposure to the image capturing element 104 are controlled by the exposure control unit 23. In addition, when the processing by the brightness adjustment unit 24 is executed, the output unit 26 outputs an image to which the processing is applied. In addition, when the processing by the gradation adjustment unit 25 is executed, the output unit 26 outputs an image to which the processing is applied.

Figure 7:
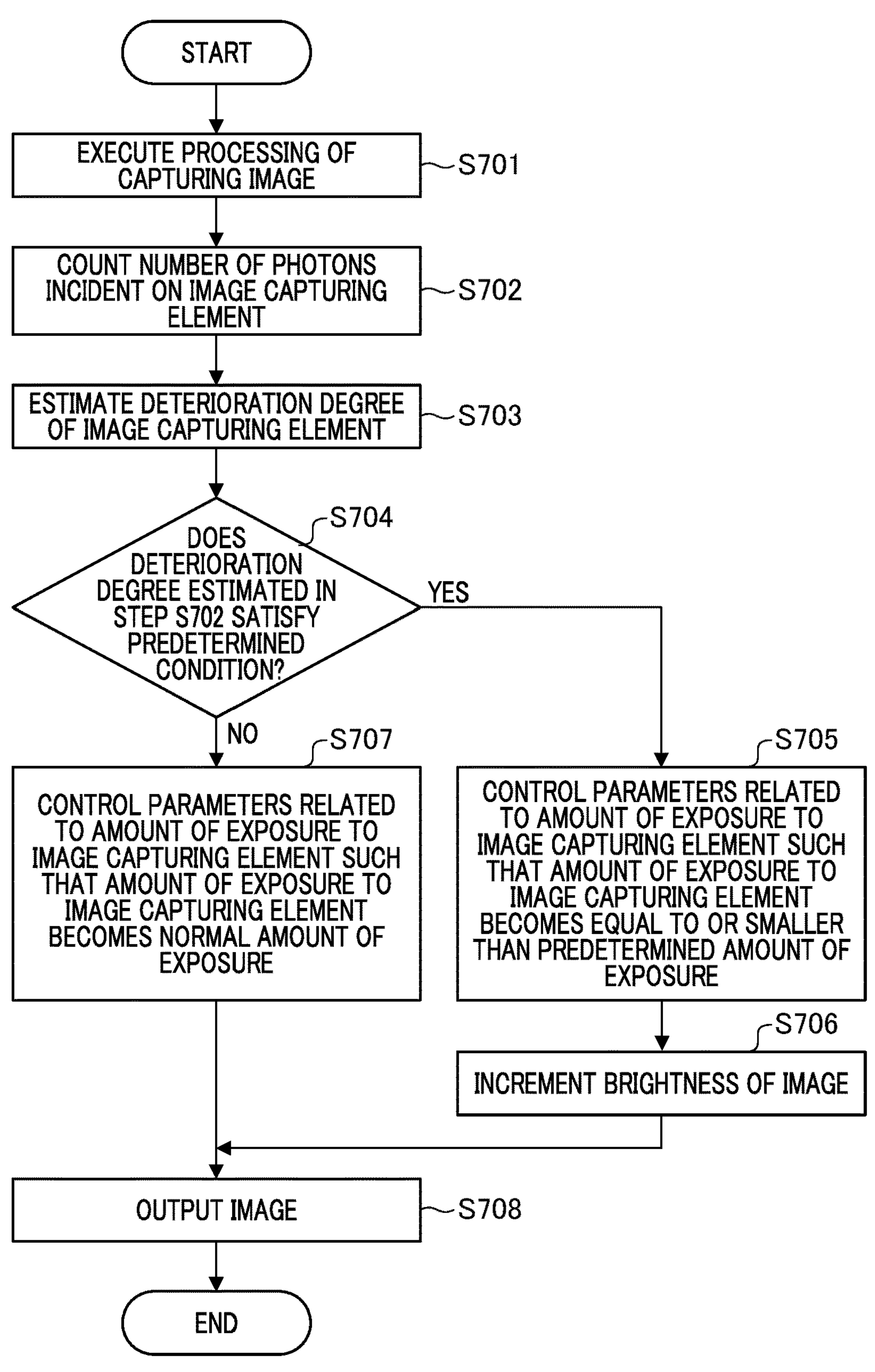
FIG. 7 is a flowchart showing an example of processing executed by the camera control device according to the First Embodiment.

Next, processing executed by the camera control device according to the First Embodiment will be described with reference to FIG. 7. FIG. 7 is a flowchart showing an example of processing executed by the camera control device according to the First Embodiment.

In Step S701, the camera 1 executes processing of capturing an image.

In Step S702, the photon counting unit counts the number of photons incident on the image capturing element 104.

In Step S703, the deterioration degree estimation unit 22 estimates the deterioration degree of the image capturing element 104.

In Step S704, the exposure control unit 23 determines whether or not the deterioration degree estimated in Step S702 satisfies the predetermined condition. When it is determined that the deterioration degree estimated in Step S702 satisfies the predetermined condition (Step S704: YES), the exposure control unit 23 causes the processing to proceed to Step S705.

Meanwhile, when it is determined that the deterioration degree estimated in Step S702 does not satisfy the predetermined condition (Step S704: NO), the exposure control unit 23 causes the processing to proceed to Step S707.

In Step S705, the exposure control unit 23 controls the parameters related to the amount of exposure to the image capturing element 104 such that the amount of exposure to the image capturing element 104 becomes equal to or smaller than the predetermined amount of exposure.

In Step S706, the brightness adjustment unit 24 increments the brightness of an image.

In Step S707, the exposure control unit 23 controls the parameters related to the amount of exposure to the image capturing element 104 such that the amount of exposure to the image capturing element 104 becomes a normal amount of exposure.

In Step S708, the output unit 26 outputs an image.

Second Embodiment

With reference to FIGS. 8 to 19, a camera control device according to a Second Embodiment will be described.

In the description of the Second Embodiment, the description will be focused on the contents different from the First Embodiment, and description of the same contents as those in the First Embodiment will be suitably omitted. In addition, in the description of the Second Embodiment, the same reference signs as those in the First Embodiment will be applied to the same constituents as those in the First Embodiment.

The exposure control unit 23 controls the parameters related to the amount of exposure to the image capturing element 104 on the basis of a program diagram related to the amount of exposure to the image capturing element 104, the program diagram being selected on the basis of the deterioration degree.

The program diagram is a diagram showing a relationship between each of the parameters related to the amount of exposure to the image capturing element 104 and the brightness of a subject and the periphery thereof and defines the order of controlling each of the parameters and the range of controlling each of the parameters.

The exposure control unit 23 may execute processing of selecting a program diagram related to the amount of exposure to the image capturing element 104. In addition, for example, at least one program diagram is stored in the ROM 202 and is read by the CPU 201 when it is used.

When the deterioration degree does not satisfy the predetermined condition described above, the exposure control unit 23 selects a normal program diagram as the program diagram and controls the parameters related to the amount of exposure to the image capturing element 104 on the basis of the normal program diagram.

Figure 8:
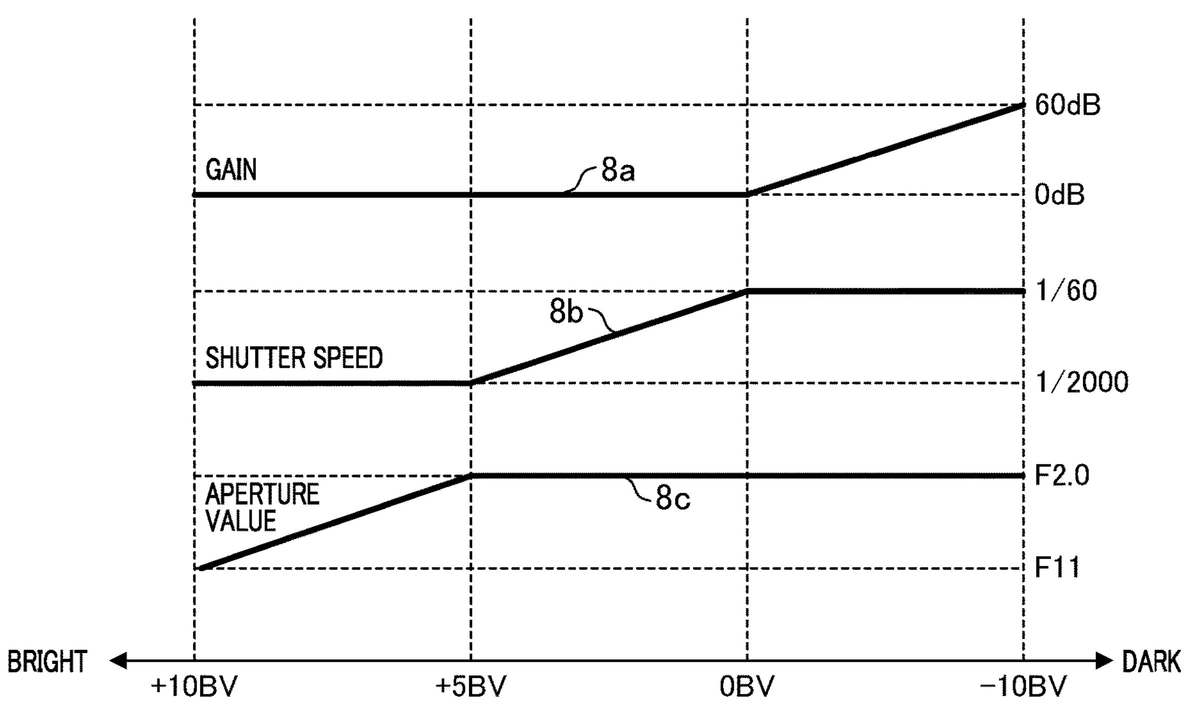
FIG. 8 is a view showing an example of a normal program diagram according to a Second Embodiment.

FIG. 8 is a view showing an example of a normal program diagram according to the Second Embodiment. The normal program diagram is a program diagram in which the quality of an image converted into an electrical signal is caused to be equal to or higher than a predetermined level by the image capturing element 104.

For example, the normal program diagram may be a program diagram in which no gain is actively applied by the control amplifier circuit 105 when the brightness of a subject and the periphery thereof is equal to or higher than a predetermined brightness in consideration of the image quality such as a signal-noise ratio of an image.

Alternatively, the normal program diagram may be a program diagram stipulating the order and the range of controlling the shutter speed set by the aperture 102 or the image capturing element 104 in consideration of correction of a depth of field, a blur of a subject, a light source flicker, and the like.

The horizontal axis in FIG. 8 indicates the brightness of a subject and the periphery thereof and indicates a brightness value (BV) having a positive correlation with the amount of exposure to the image capturing element 104. The line 8*a* indicated in FIG. 8 defines a relationship between the gain adjusted by the control amplifier circuit 105 and the brightness of a subject and the periphery thereof.

The line 8*b* indicated in FIG. 8 defines a relationship between the shutter speed and the brightness of a subject and the periphery thereof. In addition, the shutter speed has a correlation with a storage time of the image capturing element 104. The line 8*c* indicated in FIG. 8 defines a relationship between the aperture value of the aperture 102 and the brightness of a subject and the periphery thereof.

When the parameters related to the amount of exposure to the image capturing element 104 are controlled on the basis of the normal program diagram shown in FIG. 8, in order to obtain the brightness of +10 BV, the exposure control unit 23 sets the gain to 0 dB, sets the shutter speed to 1/2,000 seconds, and sets the aperture value to F11.0. In addition, in this case, the exposure control unit 23 controls the image capturing element 104 such that the storage time of the image capturing element 104 is set to 1/60 seconds.

Further, when the brightness is decremented from +10 BV, as shown in FIG. 8, the exposure control unit 23 first changes the aperture value from F11.0 to F2.0. The BV becomes +5 BV at the point of time when the aperture value becomes F2.0.

Next, when the brightness is decremented from +5 BV, as shown in FIG. 8, the exposure control unit 23 changes the shutter speed from 1/2,000 seconds to 1/60 seconds. The BV becomes 0 BV at the point of time when the shutter speed becomes 1/60 seconds.

Last, when the brightness is decremented from 0 BV, as shown in FIG. 8, the exposure control unit 23 changes the gain from 0 dB to 60 dB. The BV becomes −10 dB at the point of time when the gain becomes 60 dB.

The exposure control unit 23 can generate an image having an appropriate image quality within a range of +10 BV to −10 BV by controlling the parameters related to the amount of exposure to the image capturing element 104 on the basis of the normal program diagram shown in FIG. 8.

Instead of the normal program diagram shown in FIG. 8, the exposure control unit 23 may comply with another normal program diagram in which at least one parameter is changed in each of the ranges of the plurality of BVs which do not overlap each other. In addition, for example, the exposure control unit 23 may comply with another normal program diagram in which one or two of the gain, the shutter speed, and the aperture value are not changed.

When the deterioration degree satisfies the predetermined condition described above, the exposure control unit 23 selects a deterioration curbing program diagram as the program diagram and controls the parameters related to the amount of exposure to the image capturing element 104 on the basis of the deterioration curbing program diagram.

Figure 9:
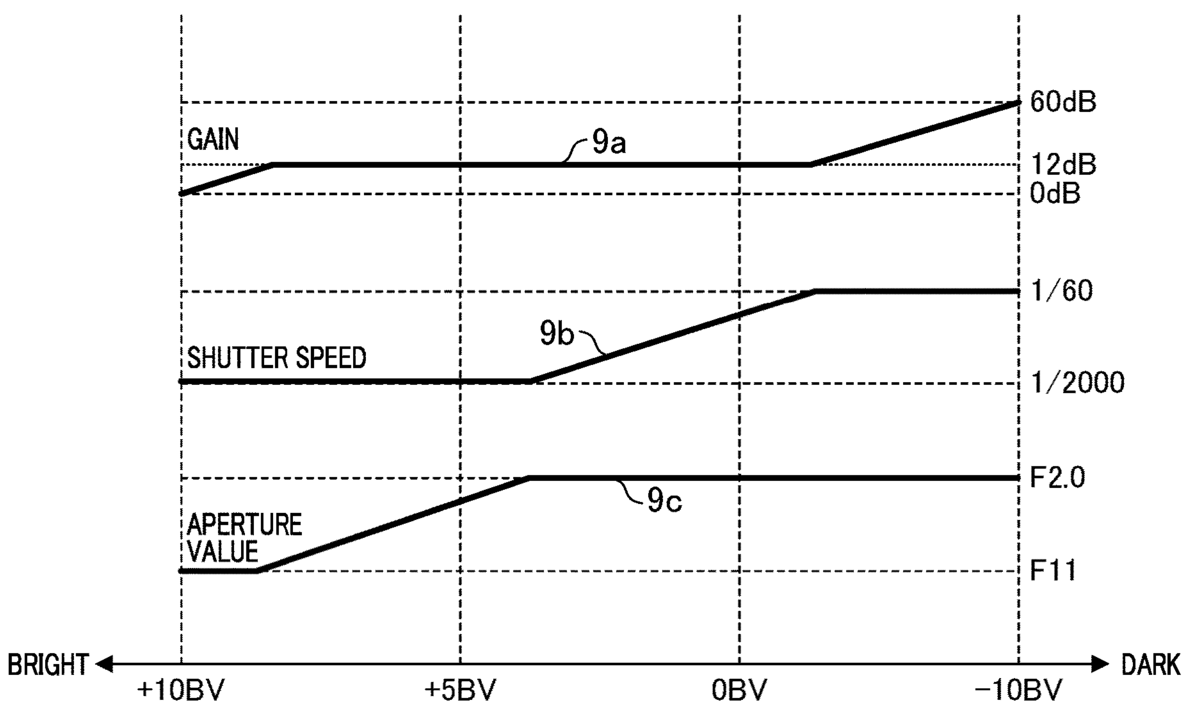
FIG. 9 is a view showing an example of a deterioration curbing program diagram according to the Second Embodiment.

FIG. 9 is a view showing an example of a deterioration curbing program diagram according to the Second Embodiment. The deterioration curbing program diagram is a program diagram in which the amount of exposure to the image capturing element 104 is caused to be equal to or smaller than the predetermined amount of exposure.

The horizontal axis in FIG. 9 indicates the BV. The line 9*a* indicated in FIG. 9 defines a relationship between the gain adjusted by the control amplifier circuit 105 and the brightness of a subject and the periphery thereof. The line 9*b* indicated in FIG. 9 defines a relationship between the shutter speed and the brightness of a subject and the periphery thereof.

In addition, the shutter speed has a correlation with the storage time of the image capturing element 104. The line 9*c* indicated in FIG. 9 defines a relationship between the aperture value of the aperture 102 and the brightness of a subject and the periphery thereof.

When the parameters related to the amount of exposure to the image capturing element 104 are controlled on the basis of the deterioration curbing program diagram shown in FIG. 9, in order to obtain the brightness of −10 BV, the exposure control unit 23 sets the gain to 60 dB, sets the shutter speed to 1/60 seconds, and sets the aperture value to F2.0.

Further, when the brightness is incremented from −10 BV, the exposure control unit 23 first changes the gain from 60 dB to 12 dB. Next, when the brightness is further incremented, the exposure control unit 23 changes the shutter speed from 1/60 seconds to 1/2,000 seconds.

Next, when the brightness is further incremented, the exposure control unit 23 changes the aperture value from F2.0 to F11.0. Last, when the brightness is further incremented, the exposure control unit 23 changes the gain from 12 dB to 0 dB.

In the deterioration curbing program diagram shown in FIG. 9, the range of the BV in which the shutter speed is controlled has become a range darker than that in the normal program diagram shown in FIG. 8. In addition, in the deterioration curbing program diagram shown in FIG. 9, the range of the BV in which the aperture is controlled has become a range darker than that in the normal program diagram shown in FIG. 8.

Therefore, in the deterioration curbing program diagram shown in FIG. 9, deterioration in the image capturing element 104 can be further curbed than in the normal program diagram shown in FIG. 8.

In the exposure control unit 23, instead of changing the shutter speed and the aperture value in accordance with the deterioration curbing program diagram shown in FIG. 9, the filter 103 may be inserted and pulled at a predetermined BV. Through such processing, the exposure control unit 23 can also exhibit effects similar to those when the shutter speed and the aperture value are changed in accordance with the deterioration curbing program diagram shown in FIG. 9.

Figure 10:
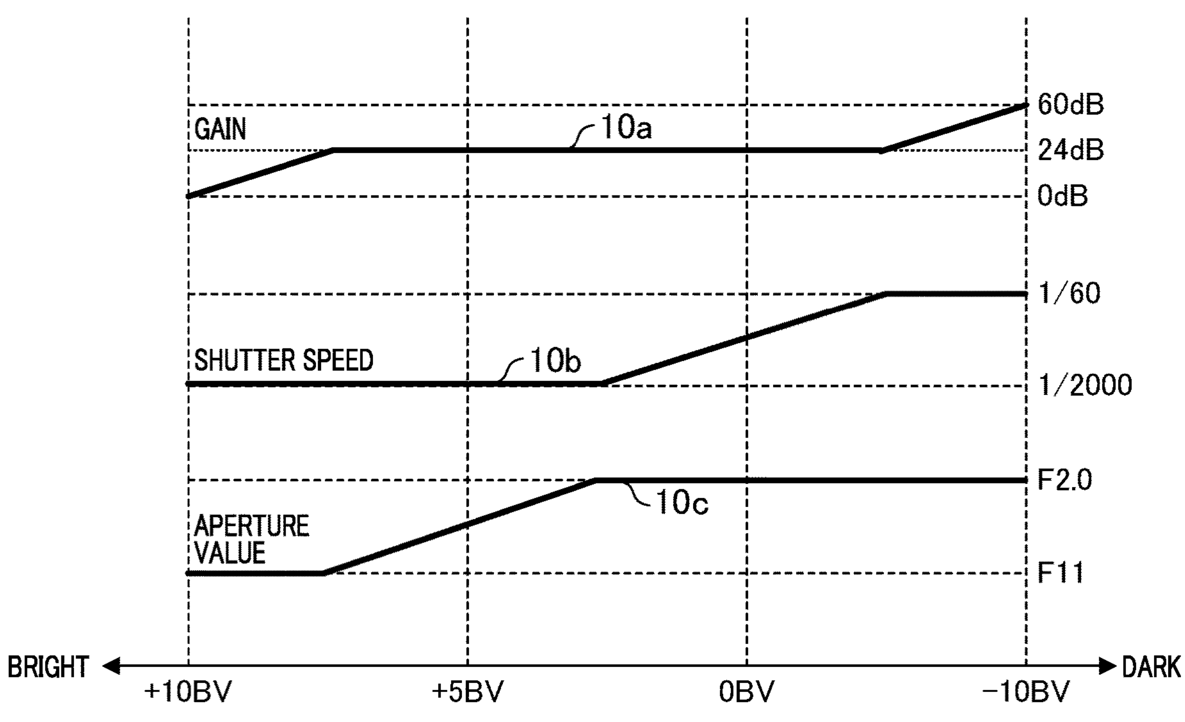
FIG. 10 is a view showing another example of the deterioration curbing program diagram according to the Second Embodiment.

When the deterioration degree satisfies the predetermined condition described above, the exposure control unit 23 selects the deterioration curbing program diagram as the program diagram and controls the parameters related to the amount of exposure to the image capturing element 104 on the basis of the deterioration curbing program diagram. FIG. 10 is a view showing another example of the deterioration curbing program diagram according to the Second Embodiment.

The horizontal axis in FIG. 10 indicates the BV. The line 10*a* indicated in FIG. 10 defines a relationship between the gain adjusted by the control amplifier circuit 105 and the brightness of a subject and the periphery thereof.

The line 10*b* indicated in FIG. 10 defines a relationship between the shutter speed and the brightness of a subject and the periphery thereof. In addition, the shutter speed has a correlation with the storage time of the image capturing element 104. The line 10*c* indicated in FIG. 10 defines a relationship between the aperture value of the aperture 102 and the brightness of a subject and the periphery thereof.

When the parameters related to the amount of exposure to the image capturing element 104 are controlled on the basis of the deterioration curbing program diagram shown in FIG. 10, in order to obtain the brightness of −10 BV, the exposure control unit 23 sets the gain to 60 dB, sets the shutter speed to 1/60 seconds, and sets the aperture value to F2.0.

Further, when the brightness is incremented from −10 BV, the exposure control unit 23 first changes the gain from 60 dB to 24 dB. Next, when the brightness is further incremented, the exposure control unit 23 changes the shutter speed from 1/60 seconds to 1/2,000 seconds.

Next, when the brightness is further incremented, the exposure control unit 23 changes the aperture value from F2.0 to F11.0. Last, when the brightness is further incremented, the exposure control unit 23 changes the gain from 24 dB to 0 dB.

In the deterioration curbing program diagram shown in FIG. 10, the range of the BV in which the shutter speed is controlled has become a range darker than that in the deterioration curbing program diagram shown in FIG. 9. In addition, in the deterioration curbing program diagram shown in FIG. 10, the range of the BV in which the aperture is controlled has become a range darker than that in the deterioration curbing program diagram shown in FIG. 9.

Therefore, in the deterioration curbing program diagram shown in FIG. 10, deterioration in the image capturing element 104 can be further curbed than in the deterioration curbing program diagram shown in FIG. 9.

In order to select a program diagram on the basis of an instruction input using the input device 204 and realize a target amount of exposure to the image capturing element 104, the exposure control unit 23 may control a plurality of parameters in order on the basis of the program diagram.

The deterioration degree estimation unit 22 may estimate a short-period deterioration degree that is a deterioration degree during a first period of time and a long-period deterioration degree that is a deterioration degree during a second period of time longer than the first period of time. For example, the first period of time is a period of time retroacting to a predetermined time from the current time.

In addition, for example, this predetermined time is several minutes, several tens of minutes, or several hours. For example, the second period of time is a predetermined period of time before the first period of time. In addition, for example, this predetermined period of time is one day to several months.

The deterioration degree estimation unit 22 estimates the short-period deterioration degree and the long-period deterioration degree through the photon number counting processing, the photon number integrating processing, the luminance measuring processing, the luminance integrating processing, the evaluation value calculating processing, or the evaluation value integrating processing. For example, the deterioration degree estimation unit 22 may record the largest value of the average luminance in the region shown in FIG. 5 for each predetermined time and may estimate at least one of the short-period deterioration degree and the long-period deterioration degree From these largest values.

In addition, for example, the deterioration degree estimation unit 22 records these largest values at timings of respective image capturing frames, timings in consideration of the capacity of a storage medium mounted in the camera 1, or the like.

FIG. 11 is a view showing an example of a relationship between a short-period deterioration degree and a long-period deterioration degree estimated by the camera control device according to the Second Embodiment and a program diagram selected by the camera control device.

"Normal program diagram" shown in FIG. 11 denotes the normal program diagram shown in FIG. 8. "Deterioration curbing program diagram (low level)" shown in FIG. 11 denotes the deterioration curbing program diagram shown in FIG. 9. "Deterioration curbing program diagram (high level)" shown in FIG. 11 denotes the deterioration curbing program diagram shown in FIG. 10.

The exposure control unit 23 selects a program diagram on the basis of at least one of the short-period deterioration degree and the long-period deterioration degree. For example, as shown in FIG. 11, the exposure control unit 23 selects a program diagram having greater effects of curbing deterioration in the image capturing element 104 for the higher short-period deterioration degree regardless of whether the long-period deterioration degree is "low", "moderate", or "high".

In addition, for example, as shown in FIG. 11, the exposure control unit 23 selects a program diagram having greater effects of curbing deterioration in the image capturing element 104 for the higher long-period deterioration degree regardless of whether the short-period deterioration degree is "low", "moderate", or "high".

Moreover, when the program diagram to be selected is changed due to change in at least one of the short-period deterioration degree and the long-period deterioration degree, for example, the exposure control unit 23 switches the program diagram in accordance with FIG. 11.

Figure 12:
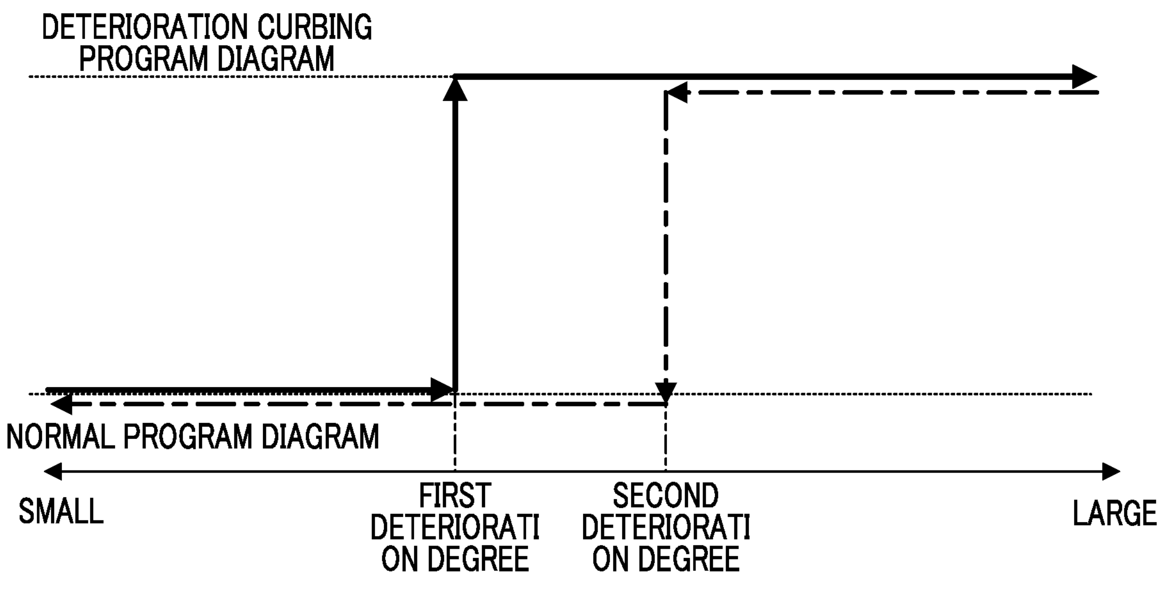
FIG. 12 is a view showing an example of processing executed during switching of the program diagram used when the camera control device according to the Second Embodiment controls parameters related to the amount of exposure to the image capturing element.

FIG. 12 is a view showing an example of processing executed during switching of the program diagram used when the camera control device according to the Second Embodiment controls parameters related to the amount of exposure to the image capturing element.

The horizontal axis in FIG. 12 indicates the deterioration degree. After the normal program diagram is selected, for example, as indicated by the solid arrow in FIG. 12, the exposure control unit 23 may switch to the deterioration curbing program diagram at the point of time when the deterioration degree increments and the deterioration degree is estimated to be a first deterioration degree.

Meanwhile, after the deterioration curbing program diagram is selected, for example, as indicated by the one-dot dashed arrow in FIG. 12, the exposure control unit 23 may switch to the normal program diagram at the point of time when the deterioration degree decrements and the deterioration degree is estimated to be a second deterioration degree larger than the first deterioration degree.

In addition, the difference between the first deterioration degree and the second deterioration degree is not particularly limited. When the deterioration degree increments and decrements within a narrow range by employing the foregoing processing, the camera control device 20 can curb frequent switching of the program diagram.

Figure 13:
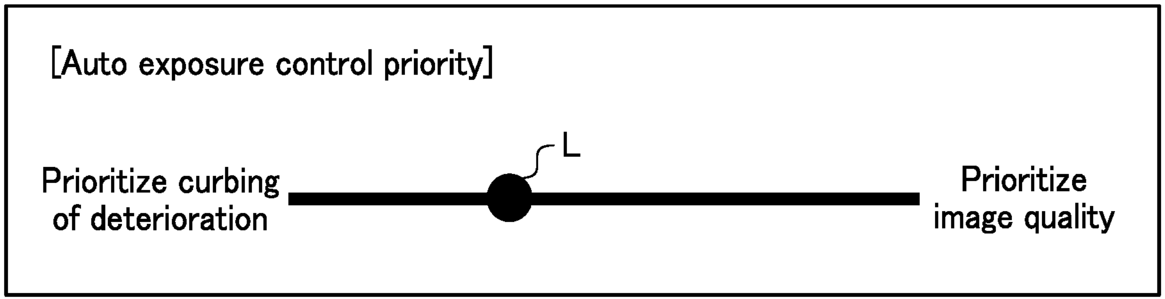
FIG. 13 is a view showing an example of a graphical user interface for selecting items to be prioritized when the parameters related to the amount of exposure to the image capturing element are controlled by the camera control device according to the Second Embodiment.

FIG. 13 is a view showing an example of a graphical user interface for selecting items to be prioritized when the parameters related to the amount of exposure to the image capturing element are controlled by the camera control device according to the Second Embodiment.

FIG. 13 is a graphical user interface (GUI) including a slider L and is displayed, for example, in a display that is an example of the output device 205.

When the slider L is positioned on the left side from the center, the exposure control unit 23 receives an instruction to prioritize curbing of deterioration in the image capturing element 104 and controls the parameters related to the amount of exposure to the image capturing element 104 on the basis of the deterioration curbing program diagram.

For example, when the parameters are controlled on the basis of the deterioration curbing program diagram shown in FIG. 9 and the slider L is positioned on the left side from the center, the exposure control unit 23 performs switching such that the parameters are controlled on the basis of the deterioration curbing program diagram shown in FIG. 10.

Meanwhile, when the slider L is positioned on the right side from the center, the exposure control unit 23 receives an instruction to prioritize curbing of deterioration in the image capturing element 104 and controls the parameters related to the amount of exposure to the image capturing element 104 on the basis of the normal program diagram.

For example, when the parameters are controlled on the basis of the deterioration curbing program diagram shown in FIG. 9 and the slider L is positioned on the right side from the center, the exposure control unit 23 performs switching such that the parameters are controlled on the basis of the normal program diagram shown in FIG. 8.

FIG. 14 is a view showing an example of regions corresponding to respective regions set by the camera control device in an image according to the Second Embodiment and an example of the average luminance measured for each of the regions.

For example, the deterioration degree estimation unit 22 sets a rectangular region disposed in four rows and five columns on the rectangular light reception surface of the image capturing element 104 and executes the luminance measuring processing for each of the regions. As shown in FIG. 14, these regions respectively correspond to the twenty regions on the image P.

In addition, for example, the luminance in each of these regions has each of the numerical values shown in FIG. 14. Each of the numerical values shown in FIG. 14 indicates the average luminance for each of the regions when the luminance of the image P is normalized in 256 levels (0 to 255) in total. However, each of the numerical values shown in FIG. 14 is measured at a time or during a period of time different from the time or the period of time when each of the numerical values shown in FIG. 5 is measured.

When the average luminance shown in FIG. 14 is estimated and the slider L shown in FIG. 13 is positioned on the left side from the center, for example, the exposure control unit 23 may determine whether or not there is a region in which the average luminance is equal to or higher than the predetermined threshold.

Further, when it is determined that there is no region in which the average luminance is equal to or higher than the predetermined threshold, the exposure control unit 23 selects the normal program diagram. Meanwhile, when it is determined that there is a region in which the average luminance is equal to or higher than the predetermined threshold, the exposure control unit 23 selects the deterioration curbing program diagram. In these cases, the predetermined threshold is 220, for example.

In addition, when it is determined that there is a region in which the average luminance is equal to or higher than the predetermined threshold in the case shown in FIG. 14, the exposure control unit 23 may select a program diagram in accordance with the table shown in FIG. 15.

FIG. 15 is a view showing an example of a relationship between the short-period deterioration degree and the long-period deterioration degree estimated by the camera control device according to the Second Embodiment and the amount of correction for the amount of exposure. For example, when the short-period deterioration degree is estimated to be "high" and the long-period deterioration degree is estimated to be "low", the exposure control unit 23 may set the amount of correction for the amount of exposure to the image capturing element 104 to −1.0 EV in accordance with the table shown in FIG. 15.

In addition, the exposure control unit 23 may adjust the amount of correction for the amount of exposure to the image capturing element 104 in accordance with the position of the slider L shown in FIG. 13.

Figure 16:
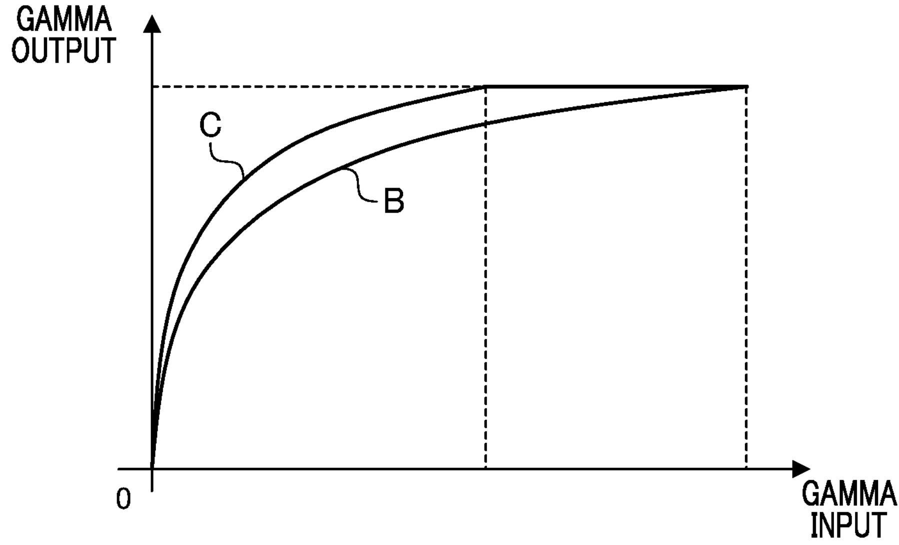
FIG. 16 is an explanatory view of correction of a gamma value executed by the camera control device according to the Second Embodiment.
Figure 17:
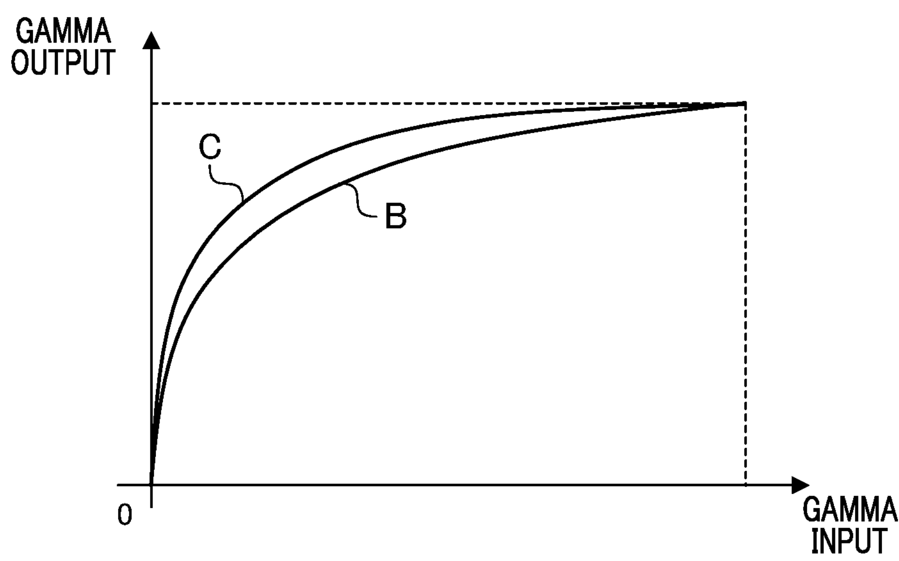
FIG. 17 is another explanatory view of correction of the gamma value executed by the camera control device according to the Second Embodiment.

The gradation adjustment unit 25 adjusts the gradation of an image generated after the parameters related to the amount of exposure to the image capturing element 104 are controlled by the exposure control unit 23. FIGS. 16 and 17 are explanatory views of correction of a gamma value executed by the camera control device according to the Second Embodiment.

The horizontal axis in FIG. 16 and the horizontal axis in FIG. 17 indicate a gamma input. The vertical axis in FIG. 16 and the vertical axis in FIG. 17 indicates a gamma output. The curves C indicated in FIGS. 16 and 17 are reference gamma value correction curves.

When the gradation is adjusted in accordance with the curve C indicated in FIG. 16, the gradation adjustment unit 25 outputs the same image as that when the gain is adjusted by the control amplifier circuit 105. Meanwhile, when the gradation is adjusted in accordance with the curve C indicated in FIG. 17, the gradation adjustment unit 25 can further curb overexposure in bright parts and gradation collapse than when the gradation is adjusted in accordance with the curve C indicated in FIG. 16.

In addition, for example, as shown in FIG. 14, when the largest value of the average luminance in each of the regions is equal to or larger than 220, the gradation adjustment unit 25 adjusts the gradation so as to compensate for the luminance of an image in accordance with the gamma correction curve C indicated in FIG. 17 by the amount corresponding to the amount of exposure decremented by the exposure control unit 23.

Figure 18:
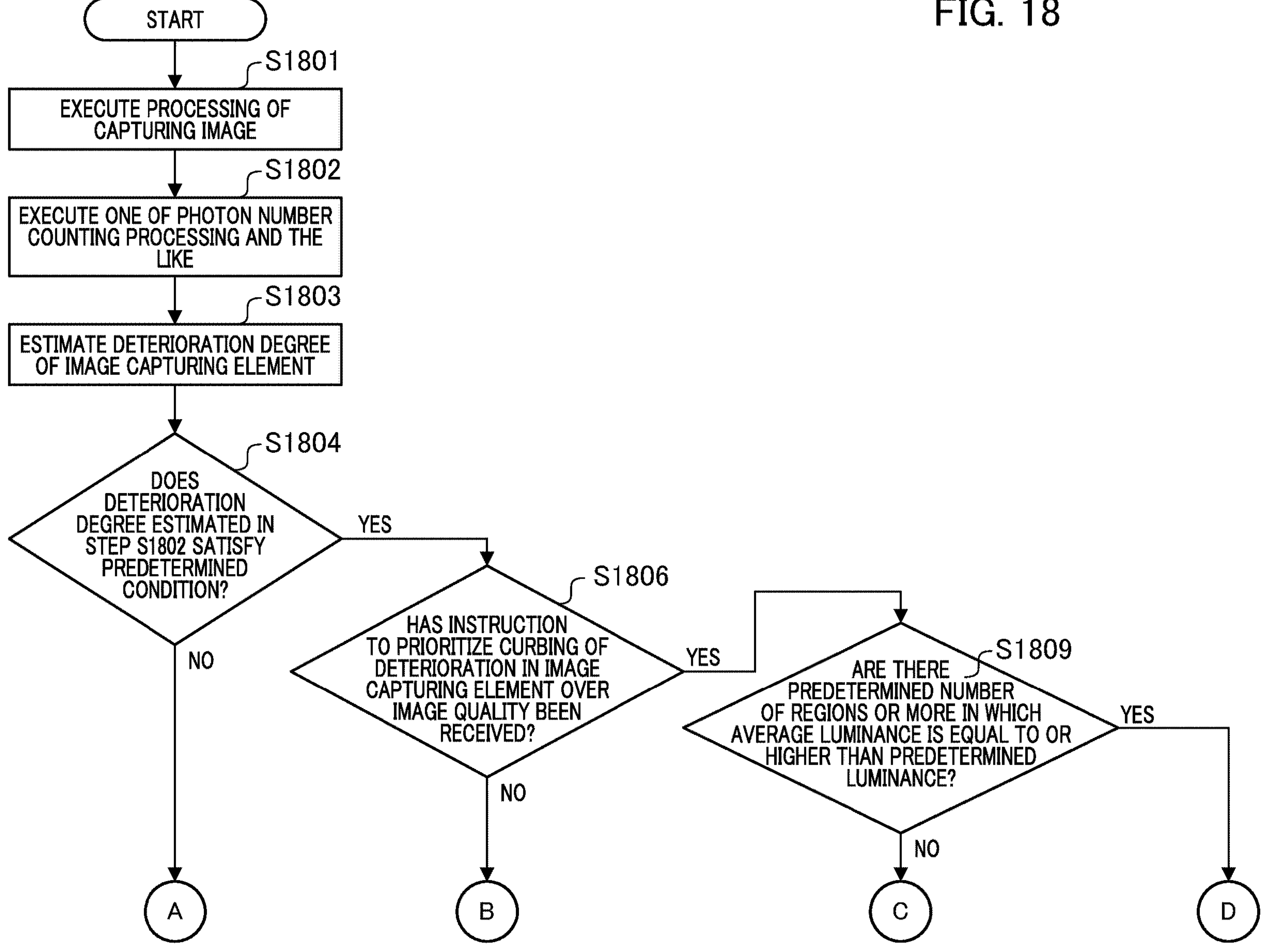
FIG. 18 is a flowchart showing an example of processing executed by the camera control device according to the Second Embodiment.

Next, processing executed by the camera control device according to the Second Embodiment will be described with reference to FIGS. 18 and 19. FIGS. 18 and 19 are flowcharts showing examples of processing executed by the camera control device according to the Second Embodiment.

In Step S1801, the camera 1 executes processing of capturing an image.

In Step S1802, the camera control device 20 executes one of the photon number counting processing and the like. Specifically, the camera control device 20 executes the photon number counting processing, the photon number integrating processing, the luminance measuring processing, the luminance integrating processing, the evaluation value calculating processing, or the evaluation value integrating processing.

In Step S1803, the deterioration degree estimation unit 22 estimates the deterioration degree of the image capturing element 104.

In Step S1804, the exposure control unit 23 determines whether or not the deterioration degree estimated in Step S1802 satisfies the predetermined condition. When it is determined that the deterioration degree estimated in Step S1802 satisfies the predetermined condition (Step S1804: YES), the exposure control unit 23 causes the processing to proceed to Step S1806.

Meanwhile, when it is determined that the deterioration degree estimated in Step S1802 does not satisfy the predetermined condition (Step S1804: NO), the exposure control unit 23 causes the processing to proceed to Step S1805.

In Step S1805, the exposure control unit 23 controls the parameters related to the amount of exposure to the image capturing element 104 such that the amount of exposure to the image capturing element 104 becomes a normal amount of exposure. The said normal amount of exposure is an amount of exposure required for the quality of an image converted into an electrical signal by the image capturing element 104 to be equal to or higher than the predetermined level.

In Step S1806, the exposure control unit 23 determines whether or not an instruction to prioritize curbing of deterioration in the image capturing element 104 over the image quality has been received. When it is determined that an instruction to prioritize curbing of deterioration in the image capturing element 104 over the image quality has been received (Step S1806: YES), the exposure control unit 23 causes the processing to proceed to Step S1809.

Meanwhile, when it is determined that an instruction to prioritize curbing of deterioration in the image capturing element 104 over the image quality has not been received (Step S1806: NO), the exposure control unit 23 causes the processing to proceed to Step S1807.

In Step S1807, the exposure control unit 23 selects the normal program diagram.

In Step S1808, the exposure control unit 23 controls the parameters related to the amount of exposure to the image capturing element 104 on the basis of the normal program diagram.

In Step S1809, the exposure control unit 23 determines whether or not there are a predetermined number of regions or more in which the average luminance is equal to or higher than predetermined luminance. When it is determined that there are a predetermined number of regions or more in which the average luminance is equal to or higher than the predetermined luminance (Step S1809: YES), the exposure control unit 23 causes the processing to proceed to Step S1812.

Meanwhile, when it is determined that there are not a predetermined number of regions or more in which the average luminance is equal to or higher than the predetermined luminance (Step S1809: NO), the exposure control unit 23 causes the processing to proceed to Step S1810.

In Step S1810, the exposure control unit 23 selects the deterioration curbing program diagram.

In Step S1811, the exposure control unit 23 controls the parameters related to the amount of exposure to the image capturing element 104 on the basis of the deterioration curbing program diagram.

In Step S1812, the exposure control unit 23 controls the parameters related to the amount of exposure to the image capturing element 104 such that the amount of exposure to the image capturing element 104 becomes equal to or smaller than the predetermined amount of exposure.

In Step S1813, the gradation adjustment unit 25 adjusts the gradation of an image.

In Step S1814, the output unit 26 outputs an image of which the gradation is adjusted in Step S1813.

Hereinabove, the camera control device 20 according to Embodiments has been described. The camera control device 20 estimates a deterioration degree indicating a degree of deterioration in the image capturing element 104 converting an image of a subject into an electrical signal. For example, the camera control device 20 estimates the deterioration degree through the photon number counting processing, the photon number integrating processing, the luminance measuring processing, the luminance integrating processing, the evaluation value calculating processing, or the evaluation value integrating processing.

Further, when the deterioration degree satisfies the predetermined condition, the camera control device 20 controls the parameters related to the amount of exposure to the image capturing element 104 such that the amount of exposure to the image capturing element 104 becomes equal to or smaller than the predetermined amount of exposure. Accordingly, the camera control device 20 can curb deterioration in the image capturing element 104 mounted in the camera 1.

In addition, the camera control device 20 executes the photon number counting processing, the photon number integrating processing, the luminance measuring processing, the luminance integrating processing, the evaluation value calculating processing, or the evaluation value integrating processing for each of the regions set on the light reception surface of the image capturing element 104 and estimates the deterioration degree For each of the regions.

Alternatively, the camera control device 20 controls the parameters related to the amount of exposure to the image capturing element 104 on the basis of the brightness of the region in which the deterioration degree is equal to or higher than the predetermined deterioration degree. Accordingly, the camera control device 20 can curb further deterioration in parts where the deterioration has progressed the most on the light reception surface of the image capturing element 104.

In addition, the camera control device 20 controls the parameters related to the amount of exposure to the image capturing element 104 on the basis of the program diagram selected on the basis of the deterioration degree. For example, when the deterioration degree does not satisfy the predetermined condition, the camera control device 20 selects the normal program diagram as the program diagram and controls the parameters related to the amount of exposure to the image capturing element 104 on the basis of the normal program diagram.

In addition, for example, when the deterioration degree satisfies the predetermined condition, the camera control device 20 selects the deterioration curbing program diagram as the program diagram and controls the parameters related to the amount of exposure to the image capturing element 104 on the basis of the deterioration curbing program diagram. Therefore, the camera control device 20 can select an appropriate program diagram in accordance with the deterioration degree and can appropriately control the parameters in association with the deterioration degree.

In addition, the camera control device 20 estimates the short-period deterioration degree that is a deterioration degree during the first period of time and the long-period deterioration degree that is a deterioration degree during the second period of time longer than the first period of time and selects the program diagram on the basis of the short-period deterioration degree and the long-period deterioration degree.

Accordingly, the camera control device 20 can select an appropriate program diagram that matches both the degree of progress in deterioration during the first period of time and the degree of progress in deterioration during the second period of time.

In addition, the camera control device 20 increments the brightness of an image generated after the parameters related to the amount of exposure to the image capturing element 104 are controlled by the exposure control unit 23. Accordingly, while curbing deterioration in the image capturing element 104, the camera control device 20 can output an image in which a required brightness is ensured.

In addition, the camera control device 20 adjusts the gradation of an image generated after the parameters related to the amount of exposure to the image capturing element 104 are controlled by the exposure control unit 23. Accordingly, while curbing deterioration in the image capturing element 104, the camera control device 20 can output an image in which the gradation is appropriately adjusted.

The exposure control unit 23 may switch the program diagram between a case in which an energy of photons incident on the image capturing element 104 belongs to a visible light region and a case in which the energy of photons incident on the image capturing element 104 belongs to an infrared region.

Accordingly, the exposure control unit 23 can select an appropriate program diagram in association with the case in which the energy of photons incident on the image capturing element 104 belongs to the visible light region or the case in which the energy of photons incident on the image capturing element 104 belongs to the infrared region.

In addition, the exposure control unit 23 may switch the program diagram on the basis whether or not a flicker is included in an image generated using the image capturing element 104. Accordingly, the exposure control unit 23 can select an appropriate program diagram in association with the case in which a flicker is included in an image generated using the image capturing element 104 or the case in which a flicker is not included in an image generated using the image capturing element 104.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the camera control device and the like through a network or various storage media. Then, a computer (or a CPU, an MPU, or the like) of the camera control device and the like may be configured to read and execute the program. In such a case, the program and the storage medium storing the program configure the present invention.

In addition, the present invention includes those realized using at least one processor or circuit configured to function of the embodiments explained above, for example. Dispersion processing may be performed using a plurality of processors.

This application claims the benefit of Japanese Patent Application No. 2023-029106, filed on Feb. 28, 2023, which is hereby incorporated by reference herein in its entirety.

What is claimed is:

1. A camera control device comprising:

at least one processor; and a memory coupled to the at least one processor, the memory storing instructions that, when executed by the at least one processor, cause the at least one processor to:

(1) execute photon number counting processing of counting the number of photons incident on an image capturing element or photon number integrating processing of integrating the number of photons incident on the image capturing element over a predetermined period of time, (2) estimate, based on the number of photons counted through the photon number counting processing or the number of photons integrated through the photon number integrating processing, a deterioration degree indicating a degree of deterioration in an image capturing element converting an image of a subject into an electrical signal, and (3) control parameters related to an amount of exposure to the image capturing element such that the amount of exposure to the image capturing element becomes equal to or smaller than a predetermined amount of exposure when the deterioration degree satisfies a predetermined condition.

2. The camera control device according to claim 1, wherein in the counting photons, the photon number counting processing or the photon number integrating processing is executed for each of regions set on a light reception surface of the image capturing element, and wherein in the deterioration degree estimation, the deterioration degree is estimated for each of the regions.

3. The camera control device according to claim 1, wherein in the deterioration degree estimation, luminance measuring processing of measuring luminance of an image converted into an electrical signal by the image capturing element or luminance integrating processing of integrating luminance of an image converted into an electrical signal by the image capturing element over a predetermined period of time is executed, and the deterioration degree is estimated on the basis of the luminance measured through the luminance measuring processing or the luminance integrated through the luminance integrating processing.

4. The camera control device according to claim 3, wherein in the deterioration degree estimation, the luminance measuring processing or the luminance integrating processing is executed for each of regions set on a light reception surface of the image capturing element, and the deterioration degree is estimated for each of the regions.

5. The camera control device according to claim 1, wherein in the deterioration degree estimation, evaluation value calculating processing of calculating an evaluation value related to brightness of an image converted into an electrical signal by the image capturing element or evaluation value integrating processing of integrating the evaluation value over a predetermined period of time is executed, and the deterioration degree is estimated on the basis of the evaluation value calculated through the evaluation value calculating processing or the evaluation value integrated through the evaluation value integrating processing.

6. The camera control device according to claim 5, wherein in the deterioration degree estimation, the evaluation value calculating processing or the evaluation value integrating processing is executed for each of regions set on a light reception surface of the image capturing element, and the deterioration degree is estimated for each of the regions.

7. The camera control device according to claim 6, wherein in the exposure control, the parameters related to the amount of exposure to the image capturing element are controlled on the basis of the brightness of the regions in which the deterioration degree is equal to or higher than a predetermined deterioration degree.

8. The camera control device according to claim 1, wherein the memory stores further instructions that, when executed by the at least one processor, cause the at least one processor to:

perform brightness adjustment of increasing a brightness of an image generated after parameters related to the amount of exposure to the image capturing element are controlled through the exposure control.

9. The camera control device according to claim 1, wherein the memory stores further instructions that, when executed by the at least one processor, cause the at least one processor to:

perform gradation adjustment of adjusting a gradation of an image generated after parameters related to the amount of exposure to the image capturing element are controlled through the exposure control.

10. The camera control device according to claim 1, wherein the image capturing element includes an avalanche photodiode.

11. A camera control device comprising:

at least one processor; and a memory coupled to the at least one processor, the memory storing instructions that, when executed by the at least one processor, cause the at least one processor to:

(1) estimate a deterioration degree indicating a degree of deterioration in an image capturing element converting an image of a subject into an electrical signal, and (2) control parameters related to an amount of exposure to the image capturing element such that the amount of exposure to the image capturing element becomes equal to or smaller than a predetermined amount of exposure when the deterioration degree satisfies a predetermined condition, wherein in the exposure control, the parameters related to the amount of exposure to the image capturing element are controlled on the basis of a program diagram related to the amount of exposure to the image capturing element, the program diagram being selected on the basis of the deterioration degree.

12. The camera control device according to claim 11, wherein in the exposure control, when the deterioration degree does not satisfy the predetermined condition, a normal program diagram having a quality of an image converted into an electrical signal by the image capturing element equal to or higher than a predetermined level is selected as the program diagram, and the parameters related to the amount of exposure to the image capturing element are controlled on the basis of the normal program diagram.

13. The camera control device according to claim 12, wherein in the exposure control, at the point of time when the deterioration degree is estimated to be a first deterioration degree after the normal program diagram is selected, the control includes switching to a deterioration curbing program diagram in which the amount of exposure to the image capturing element is equal to or smaller than the predetermined amount of exposure.

14. The camera control device according to claim 11, wherein in the exposure control, when the deterioration degree satisfies the predetermined condition, a deterioration curbing program diagram in which the amount of exposure to the image capturing element is equal to or smaller than the predetermined amount of exposure is selected as the program diagram, and the parameters related to the amount of exposure to the image capturing element are controlled on the basis of the deterioration curbing program diagram.

15. The camera control device according to claim 14, wherein in the exposure control, at the point of time when the deterioration degree is estimated to be a second deterioration degree which is larger than the first deterioration degree after the deterioration curbing program diagram is selected, the control includes switching to a normal program diagram in which the quality of an image converted into an electrical signal by the image capturing element is equal to or higher than a predetermined level.

16. The camera control device according to claim 11, wherein in the deterioration degree estimation, a short-period deterioration degree that is the deterioration degree during a first period of time and a long-period deterioration degree that is the deterioration degree during a second period of time which is longer than the first period of time are estimated, and wherein in the exposure control, the program diagram is selected on the basis of at least one of the short-period deterioration degree and the long-period deterioration degree.

17. The camera control device according to claim 11, wherein in the exposure control, the program diagram is switched between a case in which an energy of photons incident on the image capturing element belongs to a visible light region and a case in which the energy of photons incident on the image capturing element belongs to an infrared region.

18. The camera control device according to claim 11, wherein in the exposure control, the program diagram is switched on the basis of whether or not a flicker is included in an image generated using the image capturing element.

19. A non-transitory computer-readable storage medium configured to store a computer program comprising instructions for executing processes comprising:

executing photon number counting processing of counting the number of photons incident on an image capturing element or photon number integrating processing of integrating the number of photons incident on the image capturing element over a predetermined period of time;

estimating, based on the number of photons counted through the photon number counting processing or the number of photons integrated through the photon number integrating processing, a deterioration degree indicating a degree of deterioration in an image capturing element converting an image of a subject into an electrical signal; and controlling parameters related to an amount of exposure to the image capturing element such that the amount of exposure to the image capturing element becomes equal to or smaller than a predetermined amount of exposure when the deterioration degree satisfies a predetermined condition.

20. A camera control method comprising:

executing photon number counting processing of counting the number of photons incident on an image capturing element or photon number integrating processing of integrating the number of photons incident on the image capturing element over a predetermined period of time;

estimating, based on the number of photons counted through the photon number counting processing or the number of photons integrated through the photon number integrating processing, a deterioration degree indicating a degree of deterioration in an image capturing element converting an image of a subject into an electrical signal; and controlling parameters related to an amount of exposure to the image capturing element such that the amount of exposure to the image capturing element becomes equal to or smaller than a predetermined amount of exposure when the deterioration degree satisfies a predetermined condition.

* * * * *